HIGH FREQUENCY ELECTRON DISCHARGE DEVICE

Filed Jan. 6, 1964 2 Sheets-Sheet 1

INVENTORS
WAYNE G. ABRAHAM
JESSE F. KENDALL JR.
FREDERICK L. SALISBURY
BY Harry E. Aine
ATTORNEY

HIGH FREQUENCY ELECTRON DISCHARGE DEVICE

Filed Jan. 6, 1964

2 Sheets-Sheet 2

INVENTORS
WAYNE G. ABRAHAM
JESSE F. KENDALL JR.
FREDERICK L. SALISBURY
BY [signature]
ATTORNEY United States Patent Office 3,284,660
Patented Nov. 8, 1966

3,284,660
HIGH FREQUENCY ELECTRON DISCHARGE DEVICE

Wayne G. Abraham, Palo Alto, Jesse F. Kendall, Jr., Sunnyvale, and Frederick L. Salisbury, Los Altos, Calif., assignors to Varian Associates, Palo Alto, Calif., a corporation of California
Filed Jan. 6, 1964, Ser. No. 335,796
21 Claims. (Cl. 315—5.39)

The present invention relates in general to high frequency electron discharge devices and in particular to plural cavity klystron oscillators.

R.F. power sources for such applications as drivers for amplifiers or for power oscillators in airborne CW Doppler systems which are operable in the kilomegacycle range (e.g., X-band regions) and which produce more than 50 watts R.F. output and are capable of being tuned over a wide range of, for example, 2½%, are presently the subject of extensive research and development. If the above design requirements are coupled with the further requirement that the power source be extremely frequency stable, compact, rugged, easily tuned with preferably a linear tuning characteristic and capable of low noise performance for an extended period of time, then these overall design requirements have heretofore lacked an adequate solution.

The present invention provides a solution to the above stated design criteria in the form of a liquid cooled, tunable, two cavity, low noise klystron oscillator.

In order to achieve extremely low noise operating performance it is necessary for the tube designer to eliminate microphonics which immediately necessitate an extremely rugged design which requires maximizing the strength of each and every joint, port or coupling arrangement in the tube. The further requirement that the power source be compact and capable of producing at least 50 watts R.F. output necessitates the adoption of novel cooling techniques which will adequately dissipate the heat generated in a compact tube operating in the vicinity of the aforementioned power level. Similarly, the tuner mechanism must meet the design criteria of ease of tuning and tuning linearity over the tunable range while simultaneously maintaining a constant frequency at all frequencies over the tunable band regardless of vibratory conditions to which the tube may be subjected, and additionally, be capable of long life without variation in the tuning characteristics. Furthermore, a dial indication which is calibrated in frequency and linearly related to tuner rotation is an additional desirable feature in tunable tubes but presents a problem with regard to microphonics. Furthermore, high frequency electron discharge devices generally require adequate shielding of the voltage leads to the cathode portion of the device. Heretofore adequate positive protection measures with regard to the shock hazard presented by high voltage leads in the vicinity of the cathode have lacked a foolproof solution of novel nature as taught by the present invention.

Therefore, it is the object of the present invention to provide an improved klystron oscillator.

A feature of the present invention is the provision of a two cavity klystron oscillator having means for simultaneously tuning both cavities of said oscillator while varying the coupling therebetween.

One feature of the present invention is the provision of a plural cavity tunable klystron oscillator having a linear tuning characteristic.

Another feature of the present invention is the aforementioned feature wherein the linear tuning characteristic is accomplished by a tuner mechanism which comprises a single diaphragm which simultaneously tunes plural cavities while adjusting the coupling therebetween.

Another feature of the present invention is the provision of a tunable two cavity klystron oscillator capable of being tuned over a predetermined band of frequencies wherein said two cavities are overcoupled through a coupling slot and wherein means are provided to simultaneously tune said cavities while varying the amount of coupling therebetween in a manner such that said cavities remain overcoupled over the tunable band of the oscillator.

Another feature of the present invention is the inclusion in the aforementioned feature of means to cause said coupling slot resonant frequency to approach the resonant frequency of the operating mode at the higher end of said predetermined band of frequencies.

One feature of the present invention is the provision of an electron discharge device having novel cooling arrangements, wherein the collector and main body portions of the tube, including the R.F. output assembly, are provided with internal interconnected cooling passages which are capable of handling a sufficient flow of low velocity cooling fluid in a nonturbulent manner, to provide adequate thermal dissipation without introducing undesirable microphonics due to turbulence.

Another feature of the present invention is the provision of a worm gear-driven tuner mechanism which drives a spring loaded tuner shaft assembly having anti-backlash means incorporated therein.

Another feature of the present invention is the provision of a high frequency electron discharge device having the electron gun end portion wherein the cathode and beam voltage conductors are located protected by a grounded metallic sheath surrounding said conductors.

Other features and advantages of the present invention will become more apparent upon a perusal of the following specification taken in conjunction with the accompanying drawings, wherein.

Figure 1:
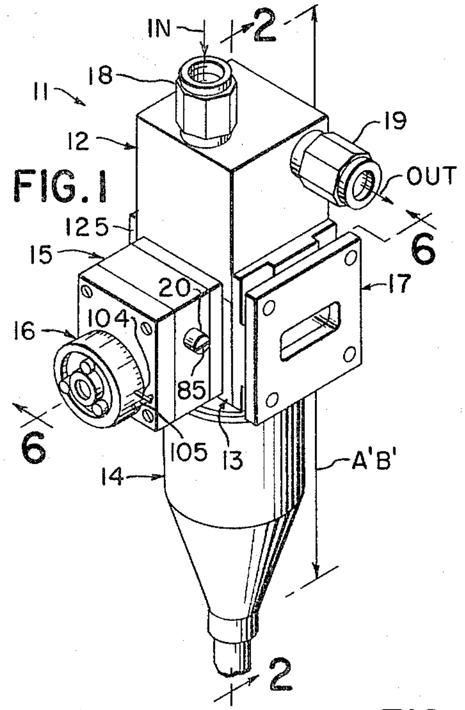
FIG. 1 is a perspective view of a novel tunable, low noise liquid cooled, two cavity klystron oscillator incorporating the novel features set forth previously.

Referring now to FIG. 1 there is depicted a novel liquid cooled, tunable low noise two cavity klystron oscillator tube 11 incorporating the features of the present invention. The tube has a collector portion 12, main body portion 13 and electron gun end portion 14, together with tuner gear box assembly 15 which incorporates a frequency calibrated dial mechanism 16. An R.F. output window assembly 17, inlet and coolant fluid coupling sections 18 and 19, respectively, and a worm gear shaft 20 are incorporated in the tube 11 and essentially complete the significant visually apparent portions of the tube as shown in FIG. 1.

Figure 2:
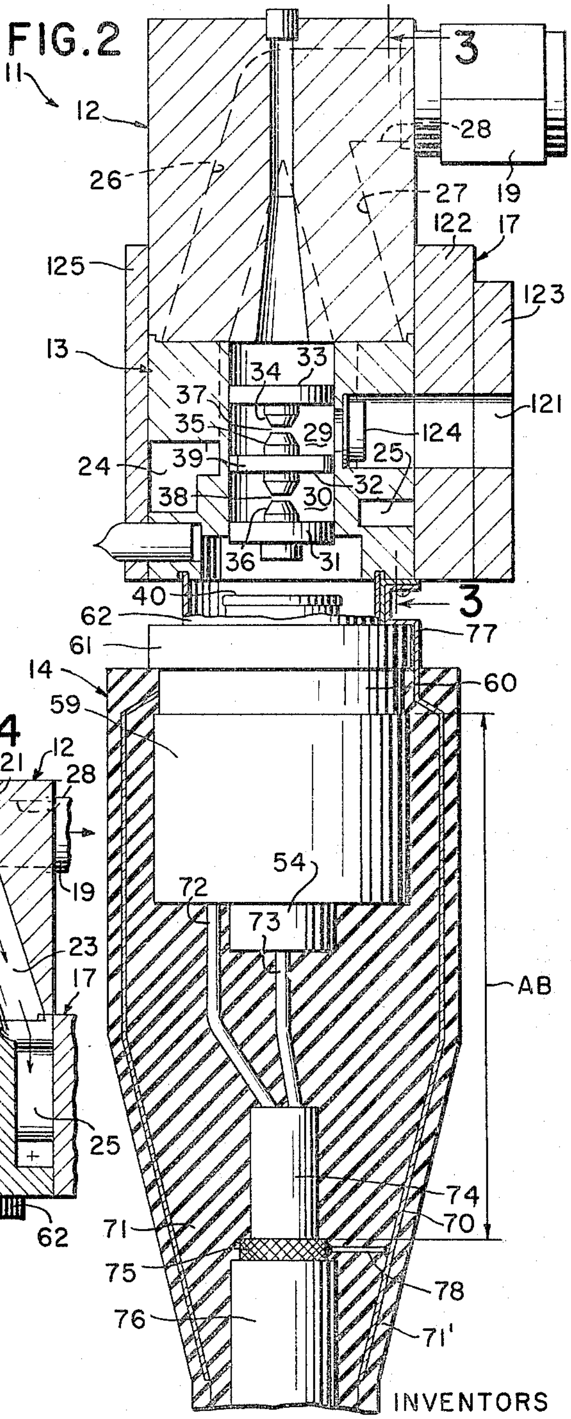
FIG. 2 is an enlarged longitudinal cross-sectional view partly in elevation of the oscillator depicted in FIG. 1 taken along lines 2—2 in the direction of the arrows.

In the enlarged cross-sectional view of FIG. 2, the internal cooling features and rugged construction of the tube are presented in greater detail. The collector portion or block 12, preferably of copper, has a number of internal cooling channels which, together with the main body portion cooling channels, form an efficient low noise cooling system for the tube. The cooling system depicted in detail in FIGS. 3 and 4 includes an inlet coupler 18 eccentrically located in the end of the collector block 12, which couples coolant fluid into a main longitudinally directed inlet channel 21 and thence through a pair of angularly diverging longitudinally directed collector cooling channels 22, 23, which in turn are coupled, respectively, to the input ends of a pair of generally U-shaped cooling channels 24 and 25 disposed on opposite sides of the tube body and traversing same. The output ends of the U-shaped channels are coupled to another pair of angularly and eccentrically disposed converging collector cooling channels 26 and 27, longitudinally directed of the collector block, which in turn are coupled at their confluence to a main outlet channel 28 which in turn is coupled to transversely directed fluid outlet coupler 19.

The cooling channels are constructed such that no protuberances exist within the channels. This design approach minimizes the possibility of turbulant coolant flow. Furthermore, all transition sections between the collector portion and main body portion channels and between the angularly disposed and main channels in the collector itself are so designed as to present minimal obstruction to fluid flow, thereby minimizing the possibility of fluid turbulence which would otherwise be a source of electronic noise. The body and collector portion cooling channels are designed so as to maximize fluid flow without adversely affecting the structural integrity of the tube so as to make it less susceptible to induced microphonics. Microphonics in any electron discharge device can be caused by vibration of the device if care is not exercised in the structural design of the tube. Furthermore, if liquid cooling is provided another and more subtle source of microphonics may exist if care is not exercised by the tube designer. For example, turbulent flow of the cooling fluid circulating through the coolant passages of the tube can cause time varying deformations of the cavity walls resulting in unwanted modulation of the output signal.

Turbulent cooling flow can arise in a number of ways. In a tube designed to operate in airborne systems three sources of turbulence would (1) turbulence present in the coolant fluid itself as it enters the coolant passages of the tube due to poor design of the exterior coupling cooling channels; (2) self-induced turbulence caused by protuberances in the cooling channels of the tube itself; and (3) turbulence caused by operation of the tube under vibratory conditions.

Figure 3:
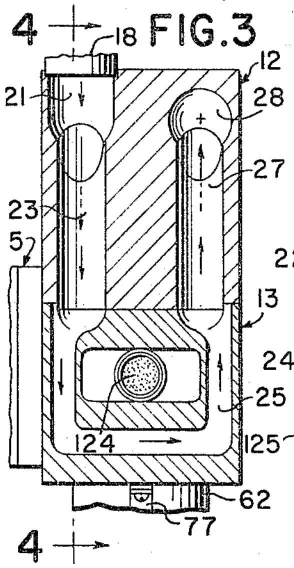
FIG. 3 is a reduced fragmentary cross-sectional view partly in elevation, of a portion of the oscillator of FIG. 2 taken along lines 3—3 in the direction of the arrows.
Figure 4:
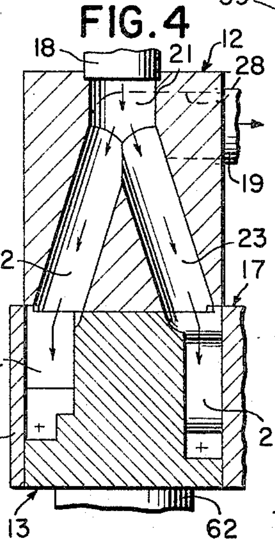
FIG. 4 is a cross-sectional view partly in elevation of the structure of FIG. 3 taken along lines 4—4 in the direction of the arrows.

In the present invention the combination of the angularly divergent collector cooling channels depicted in FIGS. 3 and 4, with the U-shaped body coolant channels has been found capable of handling 1½ gal./min. of water with a head of 90 p.s.i. for an X-band tube weighing around 3½ lbs. with an overall length (A'–B' FIG. 1) of about 9 in. This cooling system has provided an essentially noise free R.F. output of better than 75 watts with no adverse heating of the tube occurring while exhibiting AM noise levels of 125 db below the carrier at frequencies 5 kc. removed from the carrier or oscillator operating frequency. Quite obviously the volume rate of flow of coolant is varied dependent upon the amount of heat dissipated so as to prevent boiling of the coolant.

The tube main body portion 13 is preferably a solid body of copper for thermal and electrical considerations. As seen upon examination of FIG. 2, the main body portion 13 has two cavities 29 and 30 disposed within an enlarged axial bore in the body. The cavities 29 and 30 are axially defined by transverse copper headers 31, 32, and 33, having gridless integral axially aligned and spaced apart drift tubes 34, 35, and 36 defining the interaction gaps 37 and 38 in the interaction cavities 29 and 30.

An inductive coupling iris 39 terminates the one end portion of the central header 32 and functions as an integral internal feedback loop between cavities 29 and 30 to permit two cavity oscillator operation. Two cavity klystron oscillator operation using internal iris coupling is well known and the operation of such a device will not be explained in detail herein.

R.F. output window assembly 17 (see FIG. 2) is surrounded by output waveguide 121 and bounded by flange plate 122 and window flange 123 as well as window 124 disposed within the main body portion 13. Plate 122, together with plate 125 provide the exterior boundaries for U-shaped cooling channels 24 and 25.

The electron gun end portion 14 of the tube as shown in FIG. 2 includes a focusing electrode 40 preferably of Monel, which surrounds a conventional cathode assembly (not shown). The entire cathode assembly is enclosed and supported within an annular cathode to anode high voltage insulator 59 preferably of alumina, which is attached to an annular support sleeve 60 which in turn is brazed or the like to flanged portion 61 of corona shield 62 which in turn is brazed or the like to the tube main body block 13. Annular metallic support sleeve 54 within which conductor 73 extends through completes the cathode end of the vacuum envelope.

In FIG. 2, a novel electron gun ground sheath 70 is employed to protect personnel from incurring any electrical shocks in the vicinity of the cathode. The tube body is operated at ground potential while the cathode is typically operated at thousands of volts negative to establish a suitable beam voltage. This condition requires considerable care in assuring adequate insulation of the electron gun end of the tube so that operating personnel will not be electrocuted and so that the cathode is effectively isolated from the main body portion of the tube. To this end a potted silicon rubber end cap insulating means 71 surrounds the cathode and heater voltage conductors 72, 73 and accompanying silicon internal jacket 74, braided ground shield 75 and external silicon jacket 76. This would appear to provide adequate shielding to preclude any danger to operating personnel. However, the aforementioned insulation assembly is still a potential hazard since there is really no effective ground between points A–B as shown in FIG. 2 if only the silicon potted end cap 71 is utilized. For example, operating personnel could puncture the silicon end cap with a pin and contact conductors 72 or 73 and be electrocuted. This hazard does not exist in the area of the braided ground shield 75 since any pin or other penetrating object would be grounded by the braid. Thus, the present invention employs an external ground sheath 70, preferably of copper which surrounds the potted silicon rubber end cap 71 and is grounded to braided shield 75 such as by tab 78 and to the tube main body such as by tab 77 as shown. Thus, any penetrating object will automatically ground itself on the external ground sheath 70. An external silicon rubber sheath 71′ surrounds the ground sheath 70.

Figures 5, 6, 7, 8, 9, 11, 12:
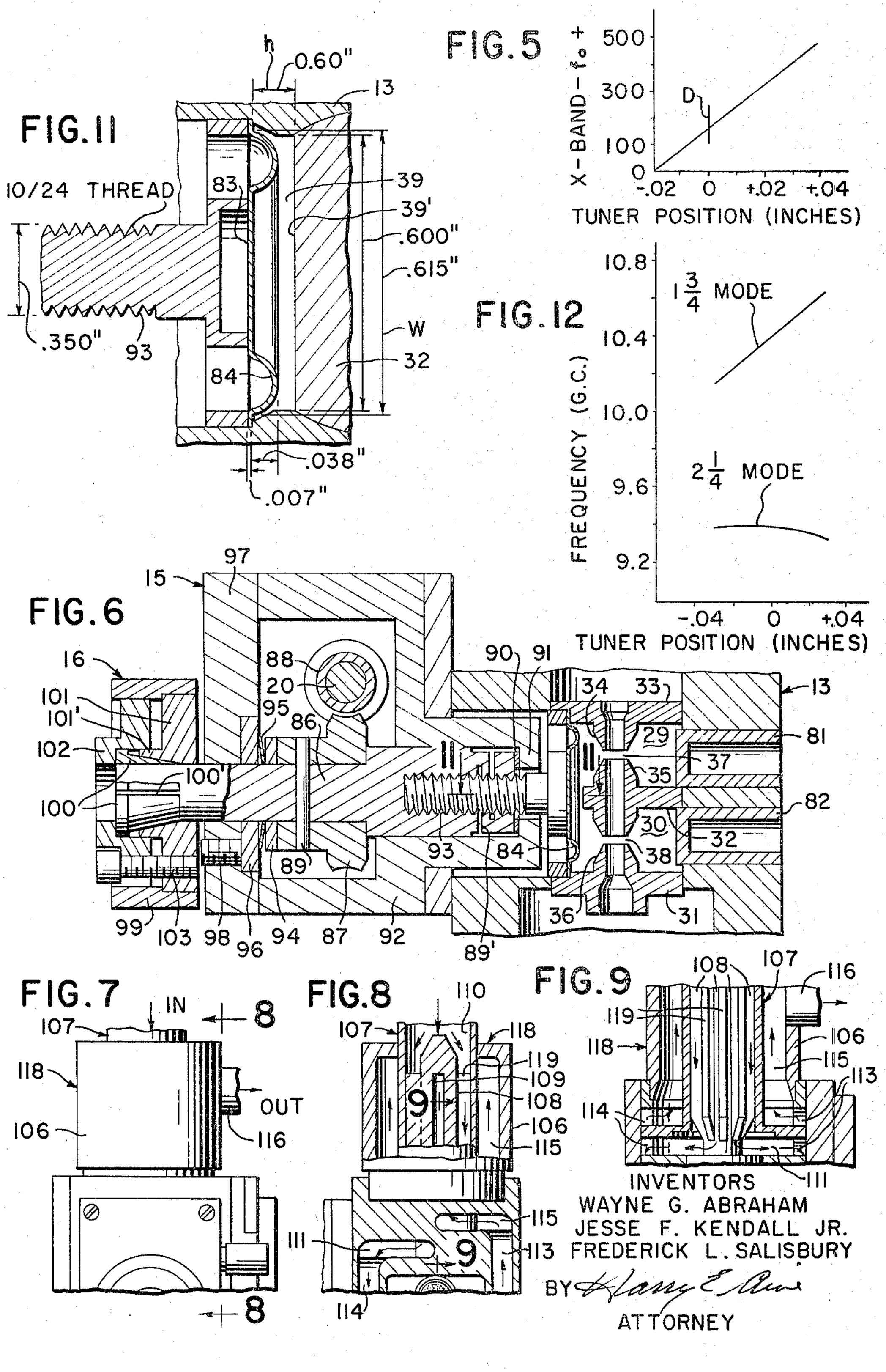
FIG. 5 is a graphical presentation of the linear tuner characteristic at X-band over a 500 mc. tunable band utilizing a tuner diaphragm having the characteristics depicted in FIG. 11 when mounted in a two-cavity oscillator such as depicted in FIG. 1.
FIG. 6 is a fragmentary enlarged cross-sectional view partly in elevation of a portion of FIG. 1 taken along lines 6—6 in the direction of the arrows, showing the tuner mechanism of the oscillator.
FIG. 7 is a fragmentary view in elevation depicting an alternative cooling arrangement for the klystron oscillator depicted in FIG. 1.
FIG. 8 is a cross-sectional view partly in elevation of FIG. 7 taken along the lines 8—8 in the direction of the arrows, showing the various cooling channels of the cooling arrangement of FIG. 7.
FIG. 9 is an enlarged fragmentary cross-sectional view of the alternate cooling system of FIG. 8 taken along lines 9—9 in the direction of the arrows.
FIG. 11 is a fragmentary cross-sectional view taken along the lines 11—11 of FIG. 6 depicting a typical tuner diaphragm employed in a two cavity oscillator operable at X-band according to the teachings of the present invention.
FIG. 12 is a graphical representation depicting the two primary resonant modes of the klystron oscillator depicted in FIG. 1 and thereafter at X-band.

In FIG. 6, the novel tuning mechanism is shown in detail. Cavities 29 and 30 are pretuned by means of inductive loading slugs 81 and 82 which are subsequently brazed in their respective apertures after pretuning operations. Coupling iris 39 functions to provide the necessary feedback between cavities 29 and 30 for oscillator operation. An annular Monel convoluted tuning diaphragm 83, having an annular enlarged portion or convolution 84 to provide adequate flexibility to enable the diaphragm to be moved over the tunable band of the tube, serves a dual electronic function. It simultaneously tunes each of the individual cavities 29 and 30 while varying the coupling therebetween. This tuning concept has been found to provide a number of advantages over such conventional prior art tuning mechanisms which require separate diaphragms for each individual cavity of a two cavity oscillator and which position the coupling iris diametrically opposite the tuner diaphragms or the same side as the tuner diaphragms. Thus, conventional two cavity oscillators require two tuner assemblies or require complicated ganging mechanisms if a single tuner shaft is used.

Figure 10:
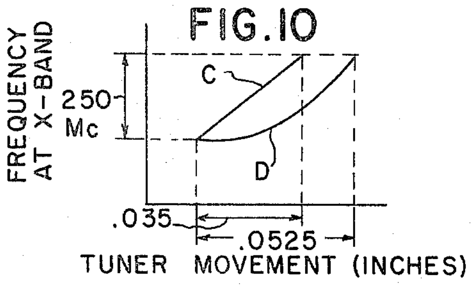
FIG. 10 is a graphical representation of tuner movement vs. frequency over a typical 250 mc. tunable band comparing the normal non-linear tuning characteristic obtained with separate cavity tuners for a two cavity oscillator with the linear tuning characteristic obtained with the single tuning diaphragm of the present invention.

Furthermore, conventional prior art tuners for two cavity oscillators do not simultaneously vary the coupling between cavities as they tune each cavity. To tune over a given band, say 250 mc. at X-band using a single diaphragm as depicted in FIG. 6, which simultaneously varies the coupling through iris 39, an overall tuner movement of approximately .035 inch is required as shown in FIG. 10 in the representative curve C. In contradistinction thereto, examination of characteristic D in FIG. 10, which denotes conventional individual tuning of each cavity with the coupling iris diametrically opposed to the tuner diaphragms, shows that approximately 50% more tuner movement is required to tune over a 250 mc. band at X-band. In addition to the increase in tuner movement required, the conventional tuning approach produces a non-linear tuning characteristic as examination of FIG. 10 shows. This introduces complex calibration problems with regard to the tuner dial and is undesirable for this reason alone.

Inductive iris 39 is formed by providing a spaced terminating edge 39′ in header 32 as best seen in FIG. 11. The width W of the iris 39 is made large enough to accommodate the annular enlarged portion or convolution 84 of the diaphragm 83 as shown in FIG. 11 while the height $h$ of the iris 39 is made such that the annular enlarged portion or convolution 84 can be accommodated therein as the high frequency end of the tunable band is approached. The overall size of the iris 39 is such that cavities 29 and 30 are overcoupled over the entire tunable band of the oscillator. It is important that enlarged portion 84 penetrate within the iris 39 as the oscillator is tuned from the low frequency end to the high frequency end of the tunable band since as the outermost edge of convolution 84 approaches the terminating edge 39′ of the iris 39 the iris resonant frequency will approach the operating mode resonant frequency. It is the combination of overcoupling between cavities over the entire tunable band of the oscillator and approximate equivalence of the resonant frequency of the iris with that of the operating mode as the high frequency end of the band is approached that results in an optimized linear tuning characteristic over the tunable band as both coupling between cavities and individual cavity resonances are simultaneously varied.

Examination of FIG. 12 which depicts a typical X-band two cavity oscillator constructed according to the teaching of the present invention shows that the chosen operating primary resonant mode of oscillation, namely, the 1¾ mode which is excited at a 10 kv. beam voltage is linear over the tunable band while the other primary resonant mode of the two cavity system, namely, the 2¼ mode is non-linear. The 2¼ mode is preferably excited with a 5 kv. beam voltage. In order to optimize efficiency of operation and to optimize tuning linearity the system is designed such that the two primary resonant modes are separated by approximately 1000 mc. at the center frequency of the tunable band for the X-band system described herein. The chosen primary mode of the system which it is desired to operate at utilizes a specific relative neutral resonant frequency differential between the cavities. For example, if the 1¾ mode is the chosen mode of oscillation of the system then the input cavity is designed to have a neutral resonant frequency which is lower than the neutral resonant frequency of the output cavity. These neutral frequencies are preferably determined with the respective cavities shorted and with the tuner diaphragm in its neutral or non-stressed conditions and the cavity resonances varied by movement of the pretuning inductive loading slugs 81, 82 which are then vacuum brazed to their respective bores. If the 2¼ mode is the chosen mode of oscillation of the system then the aforementioned neutral resonances are reversed and the output cavity is pretuned to a lower frequency than the input cavity. The differential chosen will of course depend on the degree of efficiency and linearity which is desired. Optimum linearity of the tuning characteristic of the operating primary mode is then obtained by designing the inductive iris to provide overcoupling between the cavities over the tunable band and to approach the resonant frequency of the operating mode at the upper end of the tunable band. It is, of course, to be understood that the present invention is not to be restricted to these conditions since quite obviously the broad tuning concept of and by itself is novel and can be utilized in systems which are not optimized with regard to linearity and/or efficiency.

FIG. 5 depicts the linear tuning characteristic of a two cavity oscillator operable in X-band when utilizing the novel coupling techniques of the present invention including a tuner diaphragm having the dimensions set forth in FIG. 11. It is apparent upon examination of FIG. 5 that the oscillation frequency characteristic vs. tuner diaphragm motion is linear over approximately a 500 mc. range at X-band where $f_0$ is representative of any reference frequency within X-band, while line D typifies the particular neutral or non-stressed tuner diaphragm position utilized in this case. The precise mechanism between the variation in coupling which occurs simultaneously with the tuning of each cavity which results in a linear tuning characteristic may not be completely understood theoretically, however, the aforementioned explanation is thought to be a good approximation of the mechanism of operation.

Another advantage to be derived from the utilization of a single diaphragm to tune both cavities of a two cavity oscillator is the increase in tuner diaphragm life achieved in comparison to the tuner life of the aforementioned conventional tuners. The increased tuner diaphragm life results from the reduced mechanical stresses which occur in the enlarged diaphragm in comparison to the increased mechanical stresses which occur in the smaller diaphragms of conventional individual cavity tuners as the oscillation frequency is changed. The increase in tuner life results also from the reduction in tuner diaphragm movement required to tune over a given band by virtue of the simultaneous variation of the coupling between cavities as they are tuned. Therefore, it is quite obvious that the novel tuning approach of the present invention is desirable from this standpoint alone, regardless of whether or not an overcoupled condition exists over the tunable band and regardless of whether or not the iris is designed to approximately equal the resonant frequency of the operating mode at the high frequency end of the tunable band of the oscillator in order to optimize linearity.

The tuner gear box assembly 15 includes a worm gear shaft 20, which upon rotation by suitable means such as a screwdriver positioned in slot 85 will cause rotation of tuner shaft 86 which is rotated by the intermesh of worm 88 with worm gear 87. Coupling pin 89 locks worm gear 87 to the tuner shaft 86. The enlarged end portion of shaft 86 is provided with a number preferably two of transverse slots 86' which are compressed against a stainless steel shim 90 resting on flanged portion 91 of gear box housing 92 as shown, and which functions as anti-backlash means to insure smooth and even tuner movement over the entire tunable band. This anti-backlash feature is claimed in U.S. Serial No. 48,889 by A. Fiedor and R. Rockwell, filed August 11, 1960, now Patent No. 3,104,341 and assigned to the same assignee as the present invention. The internal threads of shaft 86 grip the tuner stud 93, the head of which is affixed to diaphragm 83, and securely yet movably clamp the stud and shaft together. Surounding the tuner shaft 86 and bearing on the end face of worm gear 87 are thrust washer 94 and a spring loading Belleville washer 95 which function to maintain a constant pressure on the shaft such that the slots 86' are sufficiently compressed to control the relative pressure between the stud threads and the internal tuner shaft threads. Backing washer 96 positioned in a conforming recessed portion of gear box cover 97 bears on a Belleville washer 95 and determines the axial pressure applied to the tuner shaft 86. A number of set screws such as 98, preferably three, are threaded in bores in the gear box cover 97 and function as pressure adjusting means in conjunction with the gear box cover 97, backing washer 96 and Belleville washer 95 whereby any desired friction between the stud and tuner shaft threads may be obtained.

A direct reading calibrated dial mechanism 16 is securely attached in the end portion of tuner shaft 86 to provide a direct reading of oscillator frequency. Since, as pointed out previously, the novel tuner techniques of the present invention result in a linear tuning characteristic as evidenced by the exemplary characteristic depicted in FIG. 10, the dial sleeve 99 is easily calibrated to give a direct reading in oscillator operating frequency over the entire tunable bandwidth. However, in order to preset the dial at the correct reading in correlation with tuner shaft positions during preliminary tuning adjustments it is necessary to provide a means of rotation of the dial mechanism with respect to the tuner shaft. A novel, easily adjustable locking and positioning means is provided for this purpose which comprises wedge shaped annular split sleeve member 100, interacting hub member 101 and locking cover 102, having adjustable locking screws 103, preferably three in number. Wedge shaped sleeve 100 has a slit 100' extending along the longitudinal extent thereof to permit compression of the sleeve thereby resulting in a secure, yet easily removable, engagement of the dial mechanism 16 and the tuner shaft 86.

In operation, it is also desirable to provide a built-in stop mechanism which prevents rotation of the tuner shaft beyond the tuning range of the oscillator in order to prevent deformation of the tuner diaphragm beyond the designed range of operation. Since the calibrated tuner dial mechanism is adjustable, a stop pin 104 can be fixedly secured to the dial at the proper dial indication and a corresponding index pin such as dowel pin 105 fixedly positioned on the gear box cover 97 to thereby limit the shaft rotation (see FIG. 1). The locking and positioning means function in the following manner. Adjustable locking screws 103 are loosened sufficiently to allow relative rotation between the dial sleeve and associated hub 101, to which the dial sleeve is brazed or otherwise fixedly secured, and the tuner shaft 86. The lower and upper limit of tuner motion are determined during pretuning operations and the dial sleeve stop pin 104 is positioned so as to abut index or dowel pin 105 by rotation of the dial mechanism 16 whereupon the adjustable locking screws 103 are tightened to drive the split wedge sleeve 100 into locking engagement with the tapered shoulder portion 101', of hub member 101 to securely lock the dial mechanism 16 to the tuner shaft 86 while permitting ease of disengagement therebetween.

Obviously, the stop pin 104 and associated index pin 105 could be dispensed with and any other suitable reference index means such as a line marker could be applied to the gear box cover 97 to indicate the oscillator frequency if the rotational limiting features were not deemed advantageous.

In FIGS. 7–9, an alternative collector cooling arrangement is depicted which differs from the collector cooling arrangement of FIGS. 3 and 4 in respect to cooling efficiency and microphonics level. Briefly, the embodiment of FIGS. 7–9 shows a collector assembly 118 including an annular exterior collector shell 106 surrounding an internal collector core 107 having a plurality of longitudinal cooling slots 108 disposed therein and extending along and surrounding the tube axis. Internal collector core 107 has a central bore 109 extending partially therethrough as shown. The electron beam impinges on the surface of said bore 109 which results in heating of the surrounding metal. This heat reaches extreme levels as the operating power level increases thus necessitating suitable cooling provisions. Similarly, the tube main body, especially the cavities, is subjected to high heat levels which require suitable cooling provisions. In operation, cooling fluid enters main channel 110 and is distributed through the channels 108, to a first level 111 whereupon the fluid circulates through a pair of main body U-shaped cooling channels 113, 114 similar to the channels 24 and 25 embodied in FIGS. 3 and 4 and thence to an upper level annular hollow chamber 115 which surrounds the internal core 107 finally existing through output coupler 116. The embodiment of FIGS. 7–9 is more efficient with regard to cooling than the embodiment of FIGS. 3 and 4 by virtue of the plurality of cooling channels 108 which surround the core 107 but is more subject to microphonics due to water turbulence than the collector embodiments of FIGS. 3 and 4 because of the reduced collector bulk and many fins 119 which separate the channels 108.

A klystron oscillator weighing about 3½ lbs. and having all overall length (A'–B' FIG. 1) of about 9 in. was constructed according to the teachings of the present invention utilizing the collector depicted in FIGS. 7–9 and operable in the X-band region with a 250 mc. tunable band and a ½ gal./min. coolant water flow rate with a head of 90 p.s.i. and easily produced 75 watts R.F. output with no adverse heating while exhibiting AM noise levels of 125 db below the carrier at frequencies 5 kc. removed from the carrier or oscillator operating frequency.

It is to be noted that the present invention is not to be restricted to the long life convoluted tuner diaphragm as depicted in FIGS. 6 and 11, since the broad concept of simultaneously tuning both cavities while varying the coupling therebetween is novel of and by itself and although the convoluted tuner diaphragm is preferred a simple flat or non-convoluted tuner diaphragm, by way of example, could be utilized with an accompanying sacrifice in linearity and tuner life. Quite obviously the cooling techniques of the present invention can be advantageously utilized in other klystron devices and are not to be construed as restricted to the particular novel two cavity klystron oscillator of the present invention. Similarly the particular novel tuning approach of the present invention is not to be construed as being limited to X-band since it is obviously applicable to the microwave spectrum as well as being utilizable at varying output powers both above and below the 50 watt levels. It is also to be noted that the novel tuning approach of the present invention is also capable of being applied to other cavity configurations than the annular cavities as shown herein. For example, the tuning concept of the present invention can equally advantageously be applied to square, rectangular, etc. cavities without departing from the scope of the present invention.

Since many changes can be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A two cavity, tunable, liquid cooled, low noise and rugged electron discharge device comprising an electron gun, an interaction structure disposed within a main body portion of said device and a collector structure operatively connected together in a vacuum sealed relationship and disposed along a central beam axis, said interaction structure including two coupled cavities, wherein said two cavities are provided with iris coupling means, said two cavities being additionally provided with tuning means, said tuning means being adapted and arranged to simultaneously tune said two cavities while varying the coupling between said cavities such that a linear tuning characteristic is realized over the tunable bandwidth of the device, said tuning means including a single tuning diaphragm, said diaphragm having a tuner stud fixedly attached thereto, said stud being driven by a tuner shaft securely yet movably attached thereto, said tuner shaft having a calibrated dial mechanism fixedly attached thereto, said tuner shaft being driven by a worm gear drive mechanism and said tuner shaft being provided with spring loaded anti-backlash means, said collector and said main body portion of said device being provided with interconnected cooling channels, said main body cooling channels comprising a pair of spaced U-shaped channels, said electron gun having a cathode assembly, said electron gun including said cathode assembly having conductors for providing the device operating voltages extending therefrom, said conductors being surrounded by insulation means, said insulation means and said conductors being further surrounded by a conductive sleeve, said conductive sleeve being electrically shorted to the main body portion of said device.

2. A high frequency electron discharge device including means for forming an electron beam disposed at the upstream end portion of said device and means for collecting said electron beam disposed at the downstream end portion of said device and interaction means for providing an energy exchange between electromagnetic energy and said electron beam disposed intermediate said means for forming said electron beam and said means for collecting said electron beam, said interaction means including at least two coupled cavities, said coupled cavities being coupled together by means of electromagnetic energy coupling means and electron beam coupling means, said coupled cavities having means for simultaneously tuning each of said cavities while varying the coupling therebetween such that the coupling between said cavities increases from the low frequency end of the tunable band to the high frequency end of the tunable band.

3. The device as defined in claim 2 wherein said device is capable of being tuned over a predetermined band of frequencies and wherein said cavities are overcoupled over the entire predetermined band of frequencies.

4. The device as defined in claim 3 wherein said cavities are coupled by means of a coupling iris and wherein means are provided to cause the resonant frequency of the coupling iris to approach the resonant frequency of the operating mode of the device at the high frequency portion of said predetermined band of frequencies.

5. The device as defined in claim 2 wherein said coupling means is an iris and wherein said tuning means is a single movable diaphragm.

6. The device as defined in claim 5 wherein said diaphragm has a worm gear drive mechanism coupled thereto.

7. The device as defined in claim 5 wherein said diaphragm has a tuner shaft coupled thereto, said shaft having a calibrated dial mechanism mounted thereon, said dial mechanism having means for limiting tuner shaft rotation whereby said diaphragm cannot be stressed beyond a predetermined range.

8. An electron discharge device comprising an electron gun, main body portion having means for causing interaction between R.F. energy and an electron beam, and collector, said collector having inlet and outlet main cooling channels and a first pair of intersecting angularly divergent cooling channels interconnected with said inlet main cooling channel at said intersecting portion, a second pair of intersecting angularly divergent cooling channels interconnected with said outlet main cooling channel at said intersecting portion, said first pair of cooling channels lying in a first plane and said second pair of intersecting cooling channels lying in a second plane which is spaced from and parallel with respect to said first plane.

9. An electron discharge device comprising an electron gun, main body portion and collector, said collector including an annular exterior collector shell surrounding an internal collector core thereby defining an annular spacing therebetween, said core having a plurality of cooling slots disposed therein and extending along the longitudinal axis of the collector, said main body portion of said device having a pair of spaced U-shaped cooling channels, an end portion of each one of said pair of spaced U-shaped cooling channels being interconnected with said annular spacing between said collector shell and said collector core, the other end portions of said pair of spaced U-shaped cooling channels being interconnected with said plurality of cooling slots in said collector core to thereby define an integrated system of coolant channels for said device.

10. A two cavity klystron oscillator having means for forming and projecting a beam of electrons along a predetermined beam path, collector means for collecting said electrons disposed at the downstream end of said path and means for electromagnetic interaction with said beam disposed intermediate said beam forming and projecting means and said beam collecting means and in vacuum sealed relationship therewith, said means for electromagnetic interaction including a pair of coupled cavities having means for simultaneously tuning each of said cavities while varying the coupling therebetween, such that the coupling between said cavities increases as the operating frequency of the oscillator increases means for simultaneously tuning said cavities while varying the coupling therebetween being a convoluted diaphragm.

11. The device as defined in claim 10 wherein said cavities are capable of being tuned over a predetermined band of frequencies and wherein said cavities are overcoupled over the entire predetermined band of frequencies.

12. A high frequency electron discharge device including an electron gun means for generating an electron beam and electron collector means for collecting said beam, said device having at least two coupled cavities, said cavities having means for simultaneously tuning each of said cavities while varying the coupling therebetween, said coupling means being an iris and said tuning means being a single movable diaphragm, said diaphragm having a tuner stud fixedly attached thereto and a spring loaded tuner shaft fixedly attached to said tuner stud, said tuner shaft having anti-back lash means incorporated therein and a worm gear mechanism coupled to said tuner shaft.

13. A high frequency electron discharge device including electron gun means for generating an electron beam and electron collector means for collecting said beam, said device having at least two coupled cavities, said cavities having means for simultaneously tuning each of said cavities while varying the coupling therebetween, said coupling means being an iris and said tuning means being a single movable diaphragm, said diaphragm having a tuner shaft coupled thereto, said shaft having a calibrated dial mechanism mounted thereon, said dial mechanism having means for limiting tuner shaft rotation whereby said diaphragm cannot be stressed beyond a predetermined range, said calibrated dial mechanism including a hub having an angular tapered shoulder portion surrounding said tuner shaft and forming an angular tapered space therebetween and an angular web shaped sleeve positioned around said tuner shaft and partially disposed within said angular tapered space and adjustable locking means for forcing said web shaped sleeve tightly within said angular tapered space to thereby fixedly yet removably lock said calibrated dial mechanism to said tuner shaft.

14. The high frequency electron discharge device defined in claim 2, wherein said means for simultaneously tuning each of said cavities while varying the coupling therebetween includes a movable diaphragm having a convolution therein.

15. The high frequency electron discharge device as defined in claim 2 wherein said means for collecting said electron beam includes a metal block having inlet and outlet main cooling channels and two space pairs of intersecting angularly divergent cooling channels, one of said space pairs of intersecting angularly divergent cooling channels being interconnected with said inlet cooling channel at the intersection thereof and the other of said pair of angularly divergent cooling channels being interconnected with said outlet main cooling channel at the intersection thereof.

16. A high frequency electron discharge device having at least two coupled cavities, said cavities having means for simultaneously tuning each of said cavities while varying the coupling therebetween, said device including an electron gun, main body portion and collector, said collector including an annular exterior collector shell surrounding an internal collector core thereby defining an annular spacing therebetween, said core having a plurality of cooling slots disposed therein and extending along the longitudinal axis of the collector, said main body portion of said device having a pair of spaced U-shaped cooling channels, one end portion of each of said pairs of spaced U-shaped cooling channels being interconnected with said annular spacing between said collector shell and collector core, the other end portion of each of said pair of spaced U-shaped cooling channels being interconnected with said plurality of cooling slots in said collector core to thereby define an integrated system of cooling channels for said device.

17. A high frequency electron discharge device including electron collector means, said device having at least two coupled cavities, said cavities having means for simultaneously tuning each of said cavities while varying the coupling therebetween, said device including an electron gun having a cathode assembly, said electron gun and cathode assembly being provided with conductors leading into and connected to said electron gun and cathode assembly, said conductors being surrounded by insulation means and a conductive sleeve, said conductive sleeve being electrically shorted to said main body portion of said device.

18. A tuner diaphragm drive mechanism for high frequency electron discharge devices including a movable diaphragm having a tuner stud fixedly attached thereto and a spring loaded tuner shaft fixedly attached to said tuner stud, said tuner shaft having anti-back lash means incorporated therein, said tuner shaft having a worm gear mechanism coupled thereto, said tuner shaft having a calibrated dial mechanism mounted thereon, said dial mechanism having means for limiting tuner shaft rotation whereby said diaphragm cannot be stressed beyond a predetermined range, said calibrated dial mechanism including a hub having an angular tapered shoulder portion surrounding said tuner shaft and forming an annular tapered space therebetween, and an annular wedge shaped sleeve positioned around said tuner shaft and partially disposed within said annular tapered space and adjustable locking means for forcing said annular wedge shaped sleeve tightly within said annular tapered space to thereby fixedly, yet removably, lock said calibrated dial mechanism to said tuner shaft.

19. An electron discharge device comprising an electron gun, main body portion having means for causing interaction between R.F. energy and an electron beam, and collector means, said collector means having inlet and outlet main cooling channels and a first pair of intersecting angularly divergent cooling channels interconnected with said inlet main cooling channel at said intersection, and a second pair of intersecting angular divergent cooling channels interconnected with said outlet main cooling channel at said intersection, said main body portion being provided with a pair of spaced U-shaped cooling channels, said one pair of said spaced pair of intersecting angularly divergent cooling channels in said collector having the divergent ends thereof interconnected with an end portion of each of said U-shaped cooling channels, and said other pair of said spaced pair of intersecting angularly divergent cooling channels in said collector having the divergent ends thereof interconnected with the other end portions of each of said U-shaped cooling channels.

20. A two cavity klystron oscillator having means for forming and projecting a beam of electrons along a predetermined beam path, collector means for collecting said electrons disposed at the downstream end portion of said path and means for providing electromagnetic interaction with said beam disposed intermediate said beam forming and projecting means and said beam collecting means said means for providing electromagnetic interaction including a pair of coupled cavities having means for simultaneously tuning each of said cavities while varying the coupling therebetween, said cavities being tunable over a predetermined band of frequencies, and said cavities being overcoupled over the entire predetermined band of frequencies, said cavities being coupled together by a coupling iris, said oscillator including means for causing the resonance frequency of the coupling iris to approach the resonance frequency of the operating mode of the oscillartor at the high frequency portion of said predetermined band of frequencies.

21. A two cavity klystron oscillator having means for forming and projecting a beam of electrons along a predetermined beam path, collector means for collecting said electrons disposed at the downstream end of said path and means for providing electromagnetic interaction with said beam disposed intermediate said beam forming and projecting means and said beam collecting means, said means for providing electromagnetic interaction including a pair of coupled cavities having means for simultaneously tuning each of said cavities while varying the coupling therebetween, said coupled cavities being separated by a common wall having a central aperture therein for permitting passage of said electron beam, said common wall including an axially offset aperture forming a coupling iris between said pair of cavities and a movable timing means for simultaneously tuning each of said cavities while varying the coupling therebetween forming a wall portion of each of said coupled cavities and a wall portion of the coupling iris, said coupling iris including at least two regions of differential spacing between the common wall and the movable wall.

References Cited by the Examiner

UNITED STATES PATENTS

| | | | |
|---|---|---|---|
| 2,623,194 | 12/1952 | Jenks | 315—5.49 X |
| 2,819,453 | 1/1958 | Cohan | 333—83 |
| 2,921,270 | 1/1960 | Skwarek | 331—83 X |
| 2,984,762 | 5/1961 | Haas | 315—3.5 |
| 3,104,338 | 9/1963 | Symons | 315—5.38 X |
| 3,105,167 | 9/1963 | Broderick | 313—313 X |
| 3,192,491 | 6/1965 | Hesselberth et al. | 325—383 X |
| 3,227,913 | 1/1966 | Disman et al. | 315—3.5 |

ELI LIEBERMAN, *Primary Examiner.*

S. CHATMON, JR., *Assistant Examiner.*